M. D. Mayfield,
Peach Stoner,

N° 53,642. Patented Apr. 3, 1866.

Witnesses,
Wm Breuer
Theo Zusch

Inventor
M D Mayfield
By Munn & Co
Att'ys

UNITED STATES PATENT OFFICE.

W. D. MAYFIELD, OF ASHLEY, ILLINOIS.

MACHINE FOR CUTTING AND STONING PEACHES.

Specification forming part of Letters Patent No. 53,642, dated April 3, 1866.

*To all whom it may concern:*

Be it known that I, W. D. MAYFIELD, of Ashley, in the county of Washington and State of Illinois, have invented a new and Improved Machine for Cutting and Stoning Peaches; and I do hereby declare that the following is a full, clear, and exact description thereof, which will enable those skilled in the art to make and use the same, reference being had to the accompanying drawings, forming part of this specification.

The present invention consists in passing the peaches, one by one, between two feed wheels or pulleys having yielding bearings, where they are subjected to the action of knives or cutters, suitably connected and arranged as to cause the stones or seeds of the peaches to be removed from them and delivered into any suitable receiver, while the parts of the peach pass from the machine and are ready to be dried or in any other proper manner treated.

Figure 1:
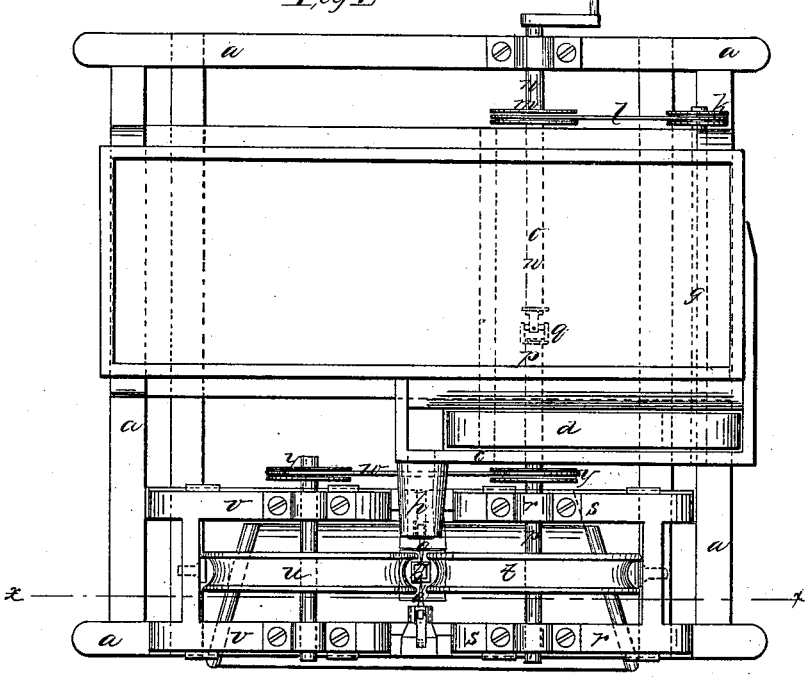
Figure 2:
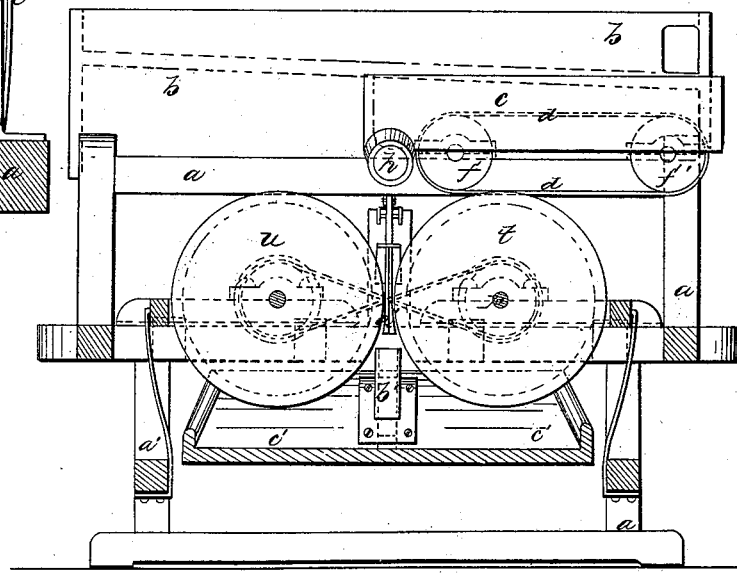

In accompanying plate of drawings my improved machine is illustrated, Figure 1 being a plan or top view; Fig. 2, a transverse vertical section taken in the plane of the line $x\ x$, Fig. 1; and Fig. 3 a detail view of one of the knives, to be hereinafter referred to.

$a\ a$ in the drawings represent the supporting frame-work of the machine having in its upper portion a box or hopper, $b$, for the reception of the peaches to be cut and stoned, communicating through an opening at one end with the trough $c$, extending along its side for a portion of the same, the bottom of which is formed of an endless belt or band, $d$, moving over drums $f f'$ at or near each of its ends, one of which drums, $f'$, is attached to a horizontal transverse shaft, $g$, turning in bearings of the frame-work $a\ a$.

At the opposite end of the trough $c$ to the opening communicating with it from the peach-box is a spout, $h$, through which the peaches, as they are drawn along by the endless belt, are fed to the devices arranged for cutting and stoning them, as will be presently explained.

On outer end of shaft $g$, before referred to, is a pulley, $k$, connected by an endless belt, $l$, with the pulley $m$ of the driving-shaft $n$, placed transversely and turning in bearings at one end of the frame-work, and at the other, by its portion $o$, secured to the part $p$ by a universal joint, $q$, in the sliding frame $r$, arranged upon the top of the main frame-work $a\ a$ so as to move forward and backward.

On the portion $p$ of the shaft $n$, and between the side pieces, $s\ s$, of the frame $r$, is secured a wheel, $t$, grooved around its periphery. $u$ is another wheel, of same size and shape as, and arranged substantially similar to, the wheel $t$ in a sliding frame, $v$, of the main frame-work, the wheels $t$ and $u$ being arranged in the same transverse plane of the machine, and their shafts connected with an endless belt, $w$, passing around pulleys $y\ y$ of the same, so that by applying power to the driving-shaft they both will revolve in unison. Between these wheels $t$ and $u$ the peaches, as they are fed through the spout $h$, fall, and as the wheels revolve are necessarily carried down with and between them, the wheels adjusting themselves to their size, because of their spring-yielding bearings, and subjected to the action of the knives $a'\ a'$ upon each side of the wheels, by which they are cut, the stones removed falling through the delivery-spout $b'$, while the cut portions of the peach slide down the inclined way $c'$ into any suitable box or receiver for them, after which they can be dried or otherwise properly treated.

Figure 3:
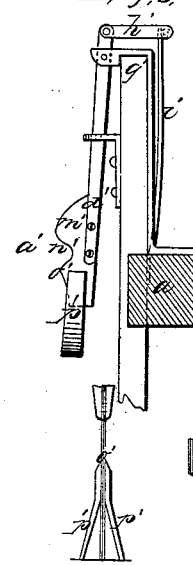

The knives $a'$, which I use, are made of the form particularly shown in Fig. 3, which is a side view of one of the same, and also illustrating the manner in which it is arranged upon the frame-work $a$ by attaching it to the lower end of a vertical swinging arm, $d'$, hung at its upper end upon a fulcrum of the post $g'$, and connected, by a link-piece, $h'$, with a bent spring, $l'$, of the post.

The upper portion, $m'$, of the cutter, as the peach is drawn down between the wheels, cuts its lower part, and the under portion, $n'$, the upper part, the small projecting portion $o'$ of the knife directing or guiding the stone between the flanges $p'\ p'$, placed in the shape of a wedge upon the lower end of the knife-blade, by which they are conducted to the delivery tube or spout $b$, the parts of the peach leaving the machine moving over the inclined way $c'$, as before specified.

The knives, by being arranged in the manner described, are allowed to adjust themselves to the size of the peach being operated upon, and also the same may be remarked of the feeding-wheels.

From the above explanation it is obvious that with my improved machine peaches can be readily and with great facility cut and stoned ready to be dried, the advantages of which are many and apparent, and it is accomplished in a novel, simple, and practical manner.

I claim as new and desire to secure by Letters Patent—

1. The feed-wheels $t$ and $u$, in combination with the knives or cutters $a'\ a'$, arranged with regard to each other and operating substantially in the manner described.

2. The wedge-shaped ends to the knives, for the purpose specified.

W. D. MAYFIELD.

Witnesses:
LE F. BLANKENSHIP,
WM. L. BROWN.